United States Patent Office 3,420,260
Patented Jan. 7, 1969

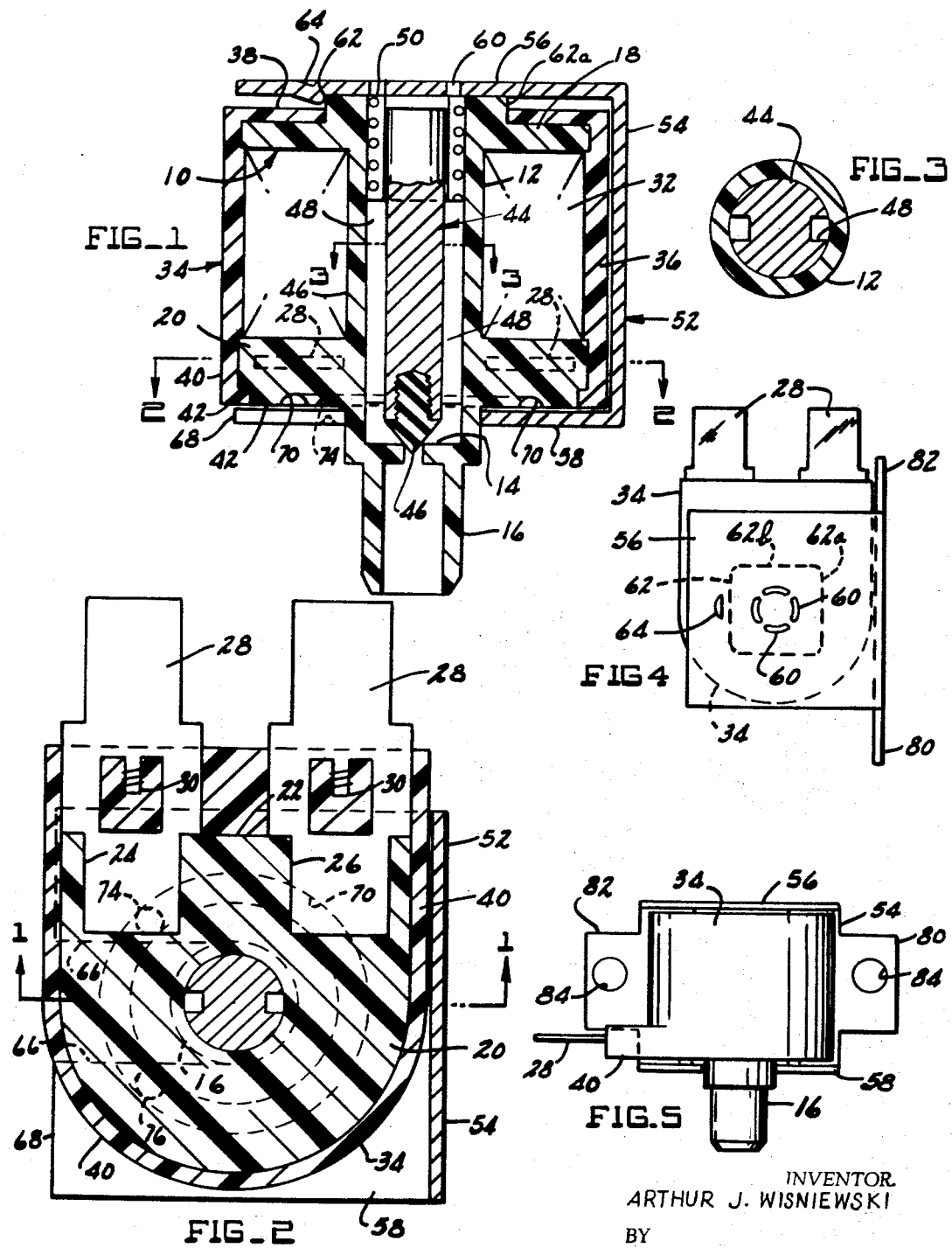

3,420,260
SOLENOID VALVE WITH INTEGRAL
PLASTIC BOBBIN AND SEAT
Arthur J. Wisniewski, Southfield, Mich., assignor to
American Standard Inc., a corporation of Delaware
Filed Dec. 2, 1966, Ser. No. 598,749
U.S. Cl. 137—315            8 Claims
Int. Cl. F16k 31/06

This invention relates to a solenoid valve, particularly the straight through type in which the fluid flows through the hollow bobbin used as a mandrel for the electrical winding.

One object of the invention is to provide a low cost solenoid valve capable of formation by a minimum number of component parts.

Another object is to provide a valve wherein the valve seat is formed as an integral part of the bobbin used for the electrical winding.

A further object is to provide a valve having a simplified manner of connecting the solenoid with its field means or frame.

A still further object is to provide a valve wherein the magnetic frame is readily connected to the solenoid by snap-on connections in lieu of the more commonly used screws.

An additional object is to provide a valve wherein the magnetic frame constitutes the means for mounting the valve in place.

Another object is to provide a valve wherein a portion of the magnetic frame constitutes the pole piece for drawing the armature away from the valve seat, thereby eliminating a separate pole piece such as is conventionally employed.

A further object is to provide a valve which can be connected into a fluid system by means of a tubular fitting formed integrally with the bobbin, thereby eliminating the separate fitting or valve body structure commonly necessary.

An additional object is to provide a valve wherein the valve body is formed integrally with the solenoid bobbin, thereby simplying the construction and eliminating certain seals usually necessary to connect the bobbin and valve body together.

Another object is to provide a valve wherein the electrical terminals can take different selected locations relative to the valve mounting, all as may be required by different in-service conditions.

In the drawings:

FIG. 1 is a sectional view of one embodiment of the invention taken on line 1—1 in FIG. 2.

FIG. 2 is a sectional view taken on line 2—2 in FIG. 1.

FIG. 3 is a fragmentary sectional view taken on line 3—3 in FIG. 1.

FIG. 4 is a top plan view on a reduced scale of the FIG. 1 embodiment.

FIG. 5 is a left end view on a reduced scale of the FIG. 1 embodiment.

As illustratively shown in the drawings, the invention includes a one piece plastic bobbin 10 formed for example as a nylon molding. Bobbin 10 comprises a hollow tubular portion 12 having an integrally formed internal shoulder 14 and a tubular extension 16. Shoulder 14 constitutes a valve seat, and extension 16 constitutes a fitting for connecting the valve into a fluid system such as an air pressure system or vacuum system. Extension 16 could be internally or externally threaded, although it may be smooth-surfaced to have flexible fluid tubing (not shown) fit directly thereon.

The bobbin tubular portion 12 is provided at its upper end with a relatively thin radial flange 18 and at its lower end with a relatively thick radial flange 20. As shown in FIG. 2, flange 20 is generally D-shaped in plan outline. The straight or flat edge portion 22 of the D shape has two horizontal slots 24 and 26 preformed therein for snugly accommodating the flat spade-type terminals 28. Leg portions 30 are stamped into the terminal material to have coil wire end portions wrapped there around. The coil, numbered 32, is wound around tubular portion 12, and the wire ends then wrapped upon leg portions 30; solder may be applied to adhere the wire ends to the terminals.

The wound bobbin may be encapsulated within a molded plastic sheath 34 having an annular portion 36 surrounding the exterior side surface of the winding and an upper end portion 38 overlying bobbin flange 18. The lower section 40 of the encapsulating sheath conforms generally to the D shape of bobbin flange 20. As shown generally in FIG. 2, the sheath section 40 is generally D-shaped whereby to surround the periphery of flange 20 and lock terminals 28 in place. Preferably the sheath extends around the lower face of the bobbin, as at 42, to better seal the windings and terminals from high ambient moisture conditions to which the encapsulated coil may be exposed. Sheath 34 may be molded of the same or different material as bobbin 10. For example, the sheath and bobbin may be formed of epoxy or nylon.

Slidably arranged within the bobbin is an armature in the form of a plunger 44 having a lower conically tipped rubber element 46 threaded therein to form a valve element surface. As shown in FIG. 3, the plunger is provided with two peripheral axially extending grooves 48 which conduct fluid such as air through the valve. The upper portion of the plunger is reduced in diameter to accommodate a coil type compression spring 50 which biases the armature to its illustrated closed position when coil 32 is de-energized.

To provide the field means for coil 32 there is utilized a C-shaped magnetic frame 52 having a web wall 54, an upper end wall 56, and a lower end wall 58. When coil 32 is energized the central area of end wall 56 functions as a magnet or pole piece to draw armature 44 upwardly thereagainst, thus opening the valve for fluid flow. End wall 56 may be provided with one or more flow openings 60 to conduct fluid to or from the valve seat, depending on whether the valve is used in a suction system or pressure system.

Retention of the magnetic frame 52 may be accomplished by snap-on surfaces formed in the end walls of the frame and bobbin 10. As shown in FIG. 4, the bobbin upper central portion is contoured as a rectangular projection which provides a straight vertical shoulder-like surface 62. Frame end wall 56 is provided with an indented or struck down portion 64 which forms a detent surface cooperable with lock surface 62 to help retain frame 52 on the bobbin. As shown in FIG. 2, frame end wall 58 is provided with a slot 66 extending inwardly from its left edge 68, whereby the frame can be inserted onto the bobbin by a right-to-left movement of the frame. In the installed position of the frame the tubular extension 16 of the bobbin extends through slot 66.

The lower face of bobbin flange 20 is provided with a circular groove 70, and frame end wall 58 is provided with two cooperating hemispherical projections 74 and 76 (see FIG. 2). As frame 52 is being installed on the bobbin the projections 74 and 76 snap into selected portions of groove 70; at the same time detent 64 snaps over shoulder surface 62. Thus, the frame is retained on the bobbin without need for screws or other fastenings.

As shown in FIGS 2 and 4, the frame has been installed on the bobbin so that terminals 28 extend upwardly. The frame can however be installed on the bobbin with the terminals extending downwardly or leftwardly. Thus, with bobbin shoulder surface 62a located in the position of shoulder 62 terminals 28 will extend downwardly (FIG. 4); in such a position projections 74 and 76 would snap into different portions of groove 70. If the bobbin were positioned with terminals 28 extending leftwardly surface 62b would occupy the position of surface 62 for thus locking against detent 64; projections 74 and 76 would then enter still different portions of groove 70. Positionment of the valve-coil with terminals 28 in any of the three selected locations can of course be effected by different groove-projection arrangements than shown in the drawing. For example, annular groove 70 can be replaced by one or more straight grooves arranged in a square pattern. Projections 74 and 76 can be elongated in the direction of the groove instead of hemispherical. Similarly, the projections can be formed in the coil bobbin and the grooves in frame wall 58.

As shown in FIGS. 4 and 5, frame wall 54 is provided with plate-like extensions 80 and 82, each having an aperture 84 therethrough. Screws, rivets or the like (not shown) may be extended through apertures 84 to mount the valve on a nonillustrated support surface. With the valve thus supported in a desired location the direction taken by the terminals 28 may be chosen from the aforementioned three positions in accordance with the most convenient position from the standpoint of access convenience and shortest lead wiring length.

It will be seen that in the illustrated valve the valve seat 14 is formed as an integral part of the bobbin used for winding the coil 32. Thus, the arrangement eliminates the conventional separate valve body and thus greatly simplifies the construction, as well as eliminating certain seals commonly found necessary. Further simplification is achieved by the fact that tubular fitting 16 is formed integrally with the bobbin and valve seat.

Conventional valves usually employ a non-magnetic guide tube within the bobbin to guide the armature. This tube necessarily increases the inner diameter of the bobbin for a given diameter armature, and thus causes some of the armature flux to take an off-axial direction. The flux thereby has a lesser density as the spool inner diameter is increased. The smaller the inner diameter of the spool the better will be the armature flux direction and effective density. Therefore, by eliminating the conventional guide tube the illustrated construction not only eliminates one component part, but also improves the flux pattern.

It will also be noted that the illustrated valve employs a simplified snap-on type of connection between the magnetic frame 52 and the bobbin 10, thus eliminating certain of the screws and brackets usually found necessary. A further feature of simplification results from the fact that frame 52 is provided with the extensions 80 and 82 which serve to mount the valve in place, thus eliminating the need for separate mounting brackets. The features taken collectively enable the valve assembly to be manufactured as a miniature device, thus conserving on materials and enabling use of the valve in locations where space is at a premium.

It will be understood that some variation in the construction and arrangement may be resorted to without departing from the spirit of the invention as set forth in the appended claims.

It is claimed:

1. A solenoid valve comprising a molded plastic bobbin having a hollow tubular central portion and integral outwardly radiating end flanges; an electrical winding surrounding the bobbin tubular portion in the space between the end flanges; said tubular portion of the bobbin having an internal shoulder formed integrally therewith, said shoulder constituting a valve seat for controlling fluid flowing through the bobbin tubular portion; an armature floatably disposed within the bobbin for movement toward and away from the valve seat; a spring within the bobbin biasing the armature in one direction; and a magnetic field means operable in conjunction with the electrical winding to bias the plunger in the other direction.

2. The valve of claim 1 and further comprising a molded tubular extension formed integrally with and projecting axially from one end of the bobbin tubular portion, said extension defining a fitting for connecting the valve into a fluid system.

3. The valve of claim 1 wherein the magnetic field means comprises a C-shaped frame having a web wall and two end walls projecting right angularly from opposite extremities of said web wall; said frame partially encircling the bobbin, the frame web wall lying along one side of the winding and the frame end walls lying outside the bobbin end flanges; said frame being formed of stiff resilient metal and having integral detent surfaces snapped onto lock surfaces formed on the bobbin end flanges so that the frame and bobbin are locked together solely by reason of the snap-on engagements.

4. The valve of claim 3 and further comprising a molded tubular extension formed integrally with and projecting axially from one end of the bobbin tubular portion, said extension defining a fitting for connecting the valve into a fluid system; one of the aforementioned frame end walls having a slot extending inwardly from one of its edges, whereby the frame can be snapped onto the bobbin with the tubular extension accommodated in the slot.

5. The valve of claim 1 and further comprising an annular plastic encapsulation sheath sealing the winding within the bobbin.

6. The valve of claim 5 and further comprising a pair of spade-type terminals connected with opposite ends of the electrical winding, said terminals projecting laterally from the bobbin and being locked in place by the encapsulation sheath; the aforementioned magnetic field means comprising a C-shaped frame having a web wall and two end walls projecting right angularly from opposite extremities of said web wall; said frame partially encircling the bobbin, the frame web wall lying along one side of the winding and the frame end walls lying outside the bobbin end flanges; said frame having snap-on detent surfaces adapted to selectively engage different sets of lock surfaces on the bobbin, whereby the terminals can take differently selected projecting positions with respect to the frame.

7. The valve of claim 1 wherein the magnetic field means comprises a metal frame partially encircling the bobbin and winding; said frame being connected with the bobbin exclusively by means of snap-on connections; and apertured plate-like extensions formed integrally with the frame for mounting the valve in place.

8. The valve of claim 1 wherein the armature comprises a plunger slidably disposed within the bobbin tubular portion in direct guided engagement with the tubular portion internal surface; the magnetic field means comprising a metal frame having an end wall extending across the end of the bobbin remote from the aforementioned valve seat, said armature plunger being disposed between said end wall and said seat for limited axial movement; the aforementioned spring being trained between the end wall and a shoulder formed on the plunger; said end wall by itself constituting the pole piece for drawing the plunger away from the valve seat when the winding is energized; said end wall having at least one flow opening therein communicating with the interior of the bobbin tubular portion.

References Cited

UNITED STATES PATENTS

| | | | |
|---|---|---|---|
| 2,764,333 | 9/1956 | Schnehain | 251—139 X |
| 3,232,312 | 2/1966 | Lansky et al. | 251—139 X |
| 3,289,697 | 12/1966 | Kotel et al. | 251—141 X |

ARNOLD ROSENTHAL, *Primary Examiner.*

U.S. Cl. X.R.

251—139, 141